(12) United States Patent
Pernu

(10) Patent No.: US 7,894,466 B2
(45) Date of Patent: Feb. 22, 2011

(54) APPARATUS, METHODS AND COMPUTER PROGRAM PRODUCTS PROVIDING PATTERN MASKING AND TRAFFIC RULE MATRIX SCHEDULING FOR MULTIRADIO CONTROL

(75) Inventor: Ville Pernu, Tampere (FI)

(73) Assignee: Nokia Corporation, Espoo (FI)

( * ) Notice: Subject to any disclaimer, the term of this patent is extended or adjusted under 35 U.S.C. 154(b) by 959 days.

(21) Appl. No.: 11/647,615

(22) Filed: Dec. 29, 2006

(65) Prior Publication Data

US 2008/0161030 A1  Jul. 3, 2008

(51) Int. Cl.
*H04B 7/212* (2006.01)
(52) U.S. Cl. .................................. 370/444; 370/347
(58) Field of Classification Search ................. 370/278, 370/329, 348, 310, 337, 347, 444
See application file for complete search history.

(56) References Cited

U.S. PATENT DOCUMENTS

| | | | |
|---|---|---|---|
| 6,442,145 B1 * | 8/2002 | De Lange et al. | 370/310 |
| 6,901,550 B2 * | 5/2005 | Adar et al. | 714/762 |
| 7,016,697 B2 * | 3/2006 | Ngai et al. | 455/522 |
| 7,065,367 B2 * | 6/2006 | Michaelis et al. | 455/452.2 |
| 7,072,616 B2 * | 7/2006 | Godfrey | 455/41.2 |
| 7,373,172 B2 * | 5/2008 | Godfrey | 455/552.1 |
| 7,555,324 B2 * | 6/2009 | Uotsu et al. | 455/575.7 |
| 7,634,232 B2 * | 12/2009 | Waxman | 455/63.1 |
| 2005/0215284 A1 * | 9/2005 | Su et al. | 455/556.2 |
| 2006/0025171 A1 * | 2/2006 | Ly et al. | 455/553.1 |
| 2006/0030266 A1 * | 2/2006 | Desai et al. | 455/41.2 |
| 2006/0084383 A1 * | 4/2006 | Ibrahim et al. | 455/41.2 |
| 2006/0205401 A1 * | 9/2006 | Palin et al. | 455/425 |
| 2006/0292986 A1 * | 12/2006 | Bitran et al. | 455/41.2 |
| 2007/0070960 A1 * | 3/2007 | Barak et al. | 370/338 |
| 2007/0082622 A1 * | 4/2007 | Leinonen et al. | 455/78 |
| 2008/0101446 A1 * | 5/2008 | Gautier et al. | 375/222 |
| 2008/0200195 A1 * | 8/2008 | Abe et al. | 455/501 |

OTHER PUBLICATIONS

Marina, Mahesh K., et al., "A Topology Control Approach for Utilizing Multiple Channels in Multi-Radio Wireless Mesh Networks", Proc. Broadnets 2005 Symposium, Boston, MA, Oct. 2005, 10 pgs.

* cited by examiner

*Primary Examiner*—Ricky Ngo
*Assistant Examiner*—Ben H Liu
(74) *Attorney, Agent, or Firm*—Harrington & Smith

(57) ABSTRACT

Disclosed herein are apparatus, methods and computer program products for implementing pattern masking scheduling in a multiradio terminal having multiradio control. When a message to be carried by a modem is configured by a multiradio controller, it is given a priority and connection properties (such as, for example, frequency band, transmit power, connection pattern type, etc.) When a set of messages have been configured, the multiradio controller sets them in a priority order and using the properties, generates a traffic rule matrix. The priorities and traffic rule matrix are then used to govern access by the modems to the communications channel. The rule matrix can reflect various constraints. For example, if connections occupy the same frequency, the connections are not allowed to operate concurrently. If connections occupy the same physical resources, they are not allowed to operate simultaneously.

37 Claims, 11 Drawing Sheets

|  | GSM TX | GSM RX | BT TX | BT RX | WLAN TX | WLAN RX |
|---|---|---|---|---|---|---|
| GSM TX | 1 | 0 | 0 | 1 | 0 | 1 |
| GSM RX | 0 | 1 | 1 | 0 | 1 | 0 |
| BT TX | 0 | 1 | 1 | 0 | 0 | 1 |
| BT RX | 1 | 0 | 0 | 1 | 1 | 0 |
| WLAN TX | 0 | 1 | 0 | 1 | 1 | 0 |
| WLAN RX | 1 | 0 | 1 | 0 | 0 | 1 |

FIG. 11

APPARATUS, METHODS AND COMPUTER PROGRAM PRODUCTS PROVIDING PATTERN MASKING AND TRAFFIC RULE MATRIX SCHEDULING FOR MULTIRADIO CONTROL

CROSS REFERENCE TO RELATED APPLICATIONS

This application is related to two U.S. patent applications filed this same day: U.S. patent application Ser. No. 11/647,620 entitled "Multiradio Synchronization and Scheduling Control"; and U.S. patent application Ser. No. 11/648,100 entitled "Apparatus, Methods and Computer Program Products Providing Temporary Link Quality Modification for Multiradio Control". The disclosure of these two related applications is hereby incorporated by reference as if fully restated herein.

TECHNICAL FIELD

The exemplary and non-limiting embodiments of this invention generally concern a multi-radio controller for use in a terminal having multiple radios seeking to transmit and to receive in a common communications channel and more particularly concerns apparatus and methods for scheduling access by radios to the communications channel so that collisions and interference are reduced.

BACKGROUND

Various distinct networks exist over which a wireless device can communicate, such as a mobile telephony network (e.g., CDMA, GSM, etc.), a wireless local area network WLAN or WiFi network, a piconet (e.g., Bluetooth). Wireless devices that communicate over multiple such networks are termed herein as multiradio devices, indicative of the multiple radios that such a device incorporates so as to enable communication over multiple networks. For example, a WLAN access point may have a radio for communication with WLAN terminals; a Bluetooth radio to couple with a printer; and a wired or wireless (e.g., Bluetooth, infrared, another WLAN) connection to the Internet. Similarly, a mobile terminal/mobile station may have one GSM modem, a CDMA modem, a Bluetooth modem (e.g., with a headset), and a DVB-H modem. Any individual multiradio device may also have more than one radio for communicating over a single network, such as a mobile station having two GSM radios so as to avoid switching between an active Node B and another Node B in preparation for a handover. Each of these radios has a modem, and "modem" and "radio" will be used interchangeably hereinafter.

More particularly for the modems operating under control of different networks, there is a potential for modems to interfere with one another when transmitting or receiving simultaneously with other modems where the disparate networks use frequency ranges that overlap and each network schedules/authorizes the multiradio device to transmit/receive at an overlapping frequency at the same time. The result is wasted bandwidth due to data collisions from different modems of the same wireless device.

One fundamental difficulty in designing a multiradio device to avoid self-collision among its modems is the ability to interpret any modem's behavior regardless of the clock-domain it uses. Not only do the modems typically have their own hardware clocks with different frequencies as compared to other modems of the same device, but they are also synchronized with their corresponding peer devices (e.g., WLAN with access point, GSM with base station, Bluetooth with an ad hoc peer). As the mobile device is moved around, its modems' synchronization with the respective peer shifts and changes, thus offsetting their transmission instances. The result is that any difference between transmission grant start times on different networks is not constant. The term slot is used herein generically to represent an authorized transmission or reception window. While the term slot is specific to some radio protocols, its use herein does not imply limitation to only those radio protocols that use the term explicitly.

Another difficulty is the nondeterministic nature of delays caused by bus arbitration within the multiradio device. If all the timing-critical functions designed for multiradio control were to be placed in a central processor, the signaling between modems and that central processor becomes the volatile factor that may handicap the entire design concept. At best it makes a software design difficult and reduces its portability among different types of multiradio devices that operate on the same sets of networks, since the different types of multiradios would exhibit different bus arbitration. At worst it generates a substantial load on that central processor due to timer checks and resynchronization calculations caused by inaccurate time information.

The foregoing description of problems encountered in the prior art concerns the lack of synchronization between modems of a multiradio device that may cause data collisions between modems of the multiradio device even if the data being transmitted/received by the modems was not scheduled to be transmitted/received at the same time in absolute terms. Even assuming resolution of the synchronization problem, there is a more general problem encountered in the art—how to schedule communication operations of multiple modems in a multiradio device. The foregoing assumed that one skilled in the art is seeking to inhibit one communication operation from interfering with another communication operation. It is not always true, however that a first communication operation performed by a first modem would necessarily interfere with a second communication operation performed by a second modem. For example, the first modem may be transmitting in a first bandwidth, and the second modem may be receiving in a second bandwidth, meaning that there would be no data collision even if the transmission and reception operations performed respectively by the first and second modems occurred at the same time. Accordingly, a scheduling method that neglects this fact would needlessly waste resources as it seeks to prevent concurrent operations by multiple modems of a multiradio device.

Scheduling that ignores actual communication operations performed by modems of a multiradio device and focuses on specifications of the modems performing the communication operations may also result in needless waste of resources. For example, a first modem may be used to transmit a first signal at a first signal transmission power that may not interfere in actual practice with reception operations performed by a second modem with respect to a second signal. Scheduling methods that "assume" interference needlessly waste resources.

Nonetheless, there are many instances when first and second modems of a multiradio device will be called upon to perform concurrent operations that are not compatible such as, for example, seeking to transmit two different signals in the same frequency bandwidth at the same time. Even assuming proper synchronization, concurrent scheduling will result in a data collision.

Accordingly, those skilled in the art in addition to seeking methods and apparatus that can synchronize operations of modems also seek methods and apparatus that allocate resources when conflicts are encountered, while scheduling simultaneous use of resources when there are no actual conflicts between operations being performed concurrently.

SUMMARY OF THE INVENTION

A first embodiment of the invention is a method practiced in a multi-modem terminal where each modem of the multi-modem terminal is associated with at least one message. The method comprises assigning each message a priority and at least one connection property; and using the priorities and connection properties assigned to the messages to control access by the modems to a common communications channel.

A second embodiment of the invention is a method practiced in a multi-modem terminal where each modem of the multi-modem terminal is associated with at least one message. The method comprises assigning each message a priority and at least one connection property, the assigned priorities comprising a collection; creating a traffic rule matrix using the connection properties assigned to the messages, the traffic rule matrix identifying compatible operational modes of the modems comprising the multi-modem terminal; and using at least one of the traffic rule matrix and the collection of priorities assigned to the messages to control access by the modems to the common communications channel.

A third embodiment of the invention is an apparatus comprising: a plurality of modems, each modem of the plurality of modems associated with at least one message and configured to transmit and to receive signals in a common communication channel; and a modem access control unit coupled to each of the plurality of modems, the modem access control unit configured to assign each of the messages associated with the modems a priority and at least one connection property; and to use the priorities and connection properties assigned to the messages associated with the modems to control access by the modems to the common communications channel.

A fourth embodiment of the invention is a computer program product comprising a computer readable memory medium tangibly embodying a computer readable program, the computer readable program executable by data processing apparatus, the computer readable program, when executed, configured to assign each message of a plurality of messages a priority and at least one connection property, wherein at least one message of the plurality of messages is associated with at least one modem of a plurality of modems in a multi-modem terminal; and to use the priorities and connection properties assigned to each of the messages to control access by the modems to a common communications channel.

In conclusion, the foregoing summary of the embodiments of the present invention is exemplary and non-limiting. For example, one of ordinary skill in the art will understand that one or more aspects or steps from one embodiment can be combined with one or more aspects or steps from another embodiment to create a new embodiment within the scope of the present invention.

BRIEF DESCRIPTION OF THE DRAWINGS

The foregoing and other aspects of these teachings are made more evident in the following Detailed Description, when read in conjunction with the attached Drawing Figures, wherein:

FIG. 11 depicts a traffic rule matrix for use in controlling access to a common communications channel by modems of a multiradio terminal in accordance with the invention;

DETAILED DESCRIPTION

In view of the bus arbitration and network timing variability discussed above, the inventors have determined that it is advantageous to map the different modems to a common reference time. Without this mapping any cross-modem comparison is meaningless, since a time value for one modem can mean something totally different to any other modem. Two terms are introduced: a Multiradio Controller MRC, and a Synchronization and Scheduling Controller SSC. The MRC may be a processor, such as a central processing unit, that controls the radios/modems in the device. Functionally, the MRC manages the interoperability issues between modems on a radio front-end level. The SSC may be an application specific integrated circuit ASIC, an application specific instruction set processor ASIP, or specific functionality built into the MRC, or even software only executable by the MRC. For ready implementation without having to re-design existing MRCs, advantageous embodiments include an ASIC/ASIP though the invention is not limited only to that embodiment. The MRC and SSC are described separately herein for clarity of description, though it should be recognized that the differing functionality may be embodied within a single processor.

Functionally, the SSC provides the MRC with the capacity to communicate with any radio on a timing-accurate level. According to specific embodiments detailed below, the SSC: 1) synchronizes the MRC with all modems and places their behavior into a common reference time domain; and 2) sets traffic schedules to modems according the instructions given by the MRC. As will be seen, certain advantages of embodiments of the invention include:

- Reduced terminal power consumption. Because the SSC is in some embodiments a separate calculation element from the master control unit MCU (which processes the MRC core functions), it allows the MCU to be put to a power-save mode more often, since all frequent time-critical functions are executed in the SSC.
- Removes the need for tight time-critical control in the MCU, drastically simplifying the design of software for the MRC.
- Removes the need for time-aware bus arbitration between modems and the MRC.
- Allows the efficient control of all modem traffic with minimum changes to the modems themselves (e.g., the modems need not store long vectors of scheduling information, since the control signals detailed below from the SSC have deterministic and minimal delay times.
- Stability over time. Because of the deterministic nature of the control signal delays between modems and SSC, the synchronization table detailed below is very reliable and is expected to last a fairly long time without the need for resynchronization.

Figure 1:
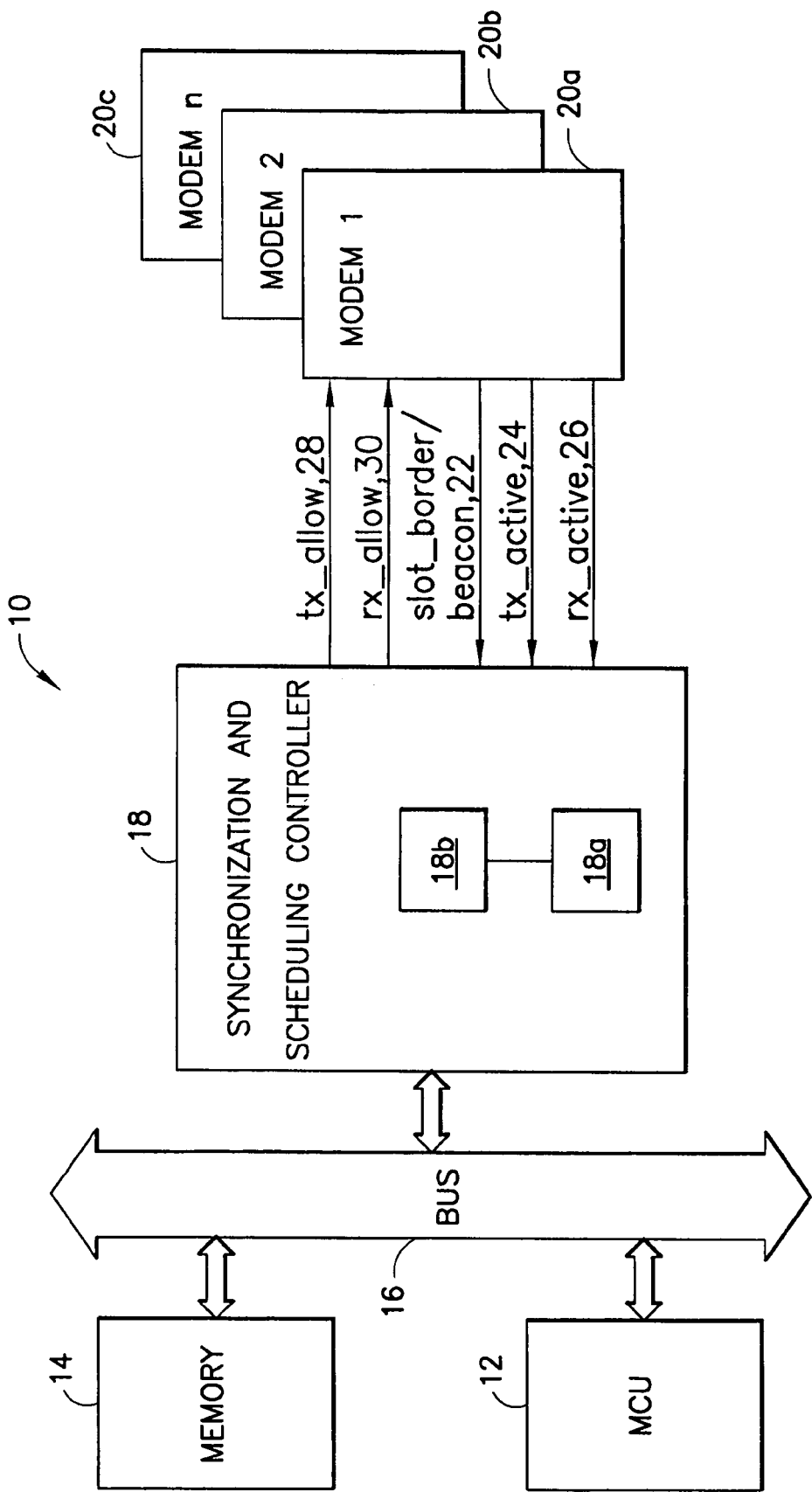
FIG. 1 shows a simplified block diagram of components of a device in accordance with an exemplary embodiment of the invention.

FIG. 1 illustrates a simplified block diagram of a multiradio device 10 incorporating the SSC functions within an ASIC/ASIP. Specifically, a MCU 12 is coupled to a memory 14 through a bus 16. Alternatively, the memory 14 maybe a part of the MCU 12 such as a random access memory RAM. The SSC 18 is shown as an ASIC/ASIP disposed between the MCU 12 and various modems 20a, 20b, 20c. There may be two or more modems, indexed by n=1, 2, . . . N. Various signals between the modems 20a, 20b, 20c and the SSC 18 are representative of signals between the SSC and an individual modem. Each modem 20a, 20b, 20c signals to the SSC 18 its slot border by a slot border beacon 22. The slot border is determined by the particular network over which that modem communicates. As noted above, some modem protocols do not use a regular traffic unit such as slots. For these protocols the slot border is replaced with the smallest network element, which in the case of WLAN is the beacon signal.

Each modem 20a, 20b, 20c further signals to the SSC 18 specific instances in which it is authorized to transmit or receive by whatever transmission protocol is used by that modem's network. (FIG. 3B describes an instance where only one tx or rx signal is necessary to resolve multiple transmit/receive authorizations.) These signals are indicated as a transmit (tx) active signal 24 and a receive (rx) active signal 26. The SSC 18 uses the slot border beacons 22 to map each modem to a common reference time, builds a schedule of transmission and reception active times/slots for each modem, and determines where instances of potential interference might occur. For example, assume modems 20a and 20b use overlapping frequencies but modem 20c does not. The SSC 18 need not inhibit transmissions or receptions for an active transmission or reception slot that overlaps as between modems 20a and 20c (or 20b and 20c), but need be concerned only with such active slot overlaps as between modems 20a and 20b since only there is a potential for self-interference among modems of the same device 10. The SSC can perform its comparison of modem schedules, regardless of the different clocks used by each modem 20a, 20b, 20c, because those schedules are mapped in the SSC 18 to a common clock, termed herein a master clock. A convenient common clock might be the system clock for the device 10, such as that referenced by the MCU 12. Other embodiments may find the SSC 18 using one of the modem clocks as a master clock, to which the other schedules from other modems are justified.

Using the various schedules mapped to a master clock, the SSC 18 then sends to each modem a transmission allow signal 28 and a reception allow signal 30, indicating for each slot, or for each authorized active slot as reported in signals 24, 26, whether or not that particular modem is inhibited or not inhibited from transmitting/receiving during that slot. This allow/inhibit signal 28, 30 is over and above any authorization given the modem by the network, so that where two modems that may potentially interfere are both authorized to be active for a time slot that overlaps with the other, one of them will be inhibited by the transmit allow/inhibit signal 28 and/or the receive allow/inhibit signal 30. While the invention is detailed with respect to allow/inhibit signals 28, 30 from the SSC 18 to one of two modems 20a, 20b, 20c that potentially overlap, it is understood that for the case of three or more overlapping active slots for potentially interfering modems, the SSC 18 sill send inhibit signals to all but one of those modems 20a, 20b, 20c.

Figure 2:
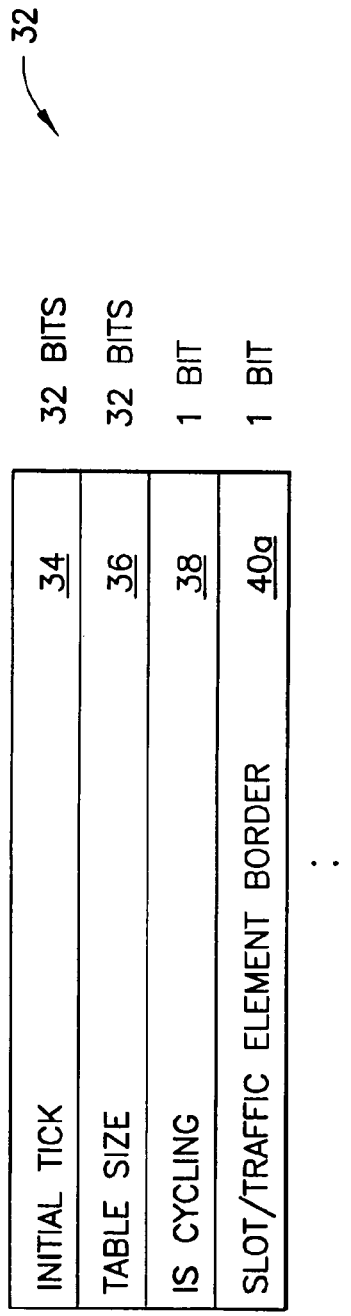
FIG. 2 illustrates an exemplary format for a synchronization table that may be generated for one of the modems in FIG. 1, according to an exemplary embodiment of the invention.

In an embodiment, the SSC 18 maps the slot border beacons 22 from the various modems 20a, 20b, 20c to a master clock by means of a synchronization table 32, the format of which is shown in FIG. 2. While this is described as one synchronization table for one modem, it is understood that a synchronization table is generated for each modem, and the same information may be combined into a unified table and stored as such. For simplicity a single table per modem is detailed. It is advantageous that the SSC 18 write the synchronization table(s) to the memory 14 for ready access by the MCU 12, which is in fact in overall control of the modems 20a, 20b, 20c. Direct control by the SSC 18 over the modems is limited to the allow/inhibit signals 28, 30; other control signals originating at the MCU 12 may be merely passed through the SSC 18 unchanged, or alternatively modified as necessary to reflect the described allow/inhibit signals 28, 30 but otherwise passed through if not modified. Direct allow/inhibit signals 28, 30 are seen as simpler in that the other control signals from the MCU 12 are generally not time-critical to the clocks of the modems, unlike the allow/enable signals 28, 30.

The synchronization table 32 of FIG. 2 shows four distinct fields: an initial tick field 34, a table size field 36, a cycling field 38, and a plurality of slot/traffic border element fields 40a through 40x. The initial tick field 34 field tells the absolute time value, at which this table 32 becomes valid. The table size field 36 indicates how many traffic element border fields (40a to 40x) there are in this table 32. The cycling field 38 indicates whether the table 32 is valid after the time instant given by adding the initial tick field 34 to the number of slot/traffic element border fields 40a to 40x (initial tick+table size). That is, if the table cycle field 38 indicates cycling, the synchronization table 32 is re-used. If the table 32 is cycling, it can be used indefinitely. Each slot/traffic element border field 40a to 40x indicates whether there is a slot border timed (in the modem 20a, 20b, 20c to which this synchronization table 32 applies) at the tick instant given by the position of that slot/traffic element 40a, . . . 40x (e.g., at time initial tick+ element index).

Figure 4:
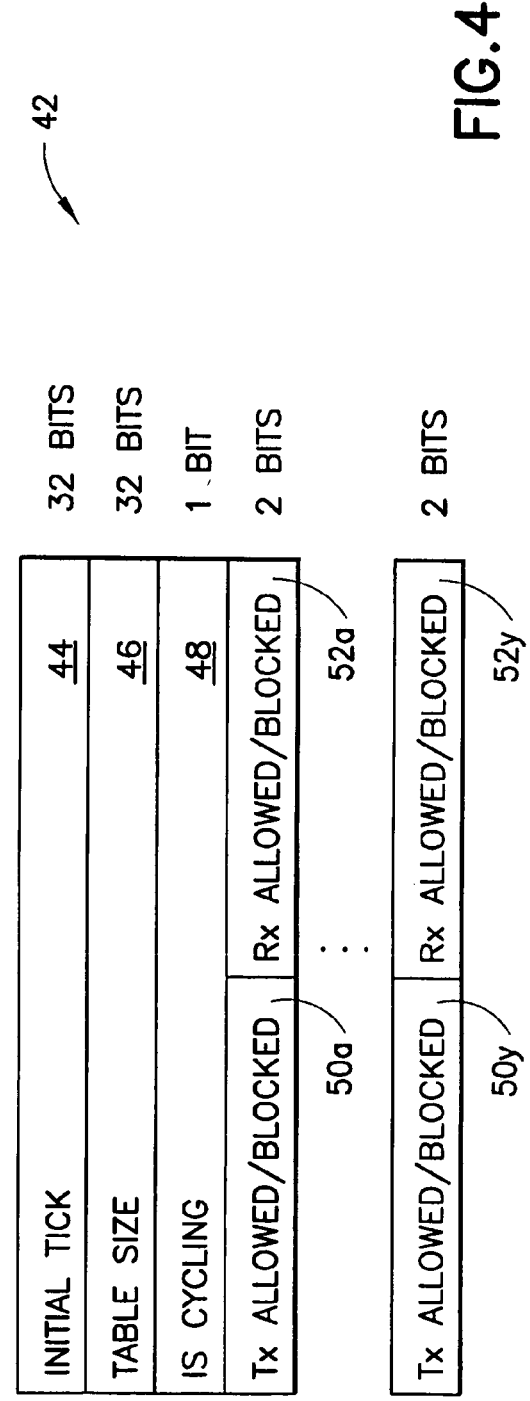
FIG. 4 illustrates an exemplary format for a scheduling table that may be generated for one of the modems in FIG. 1, according to an exemplary embodiment of the invention.
Figure 3A:
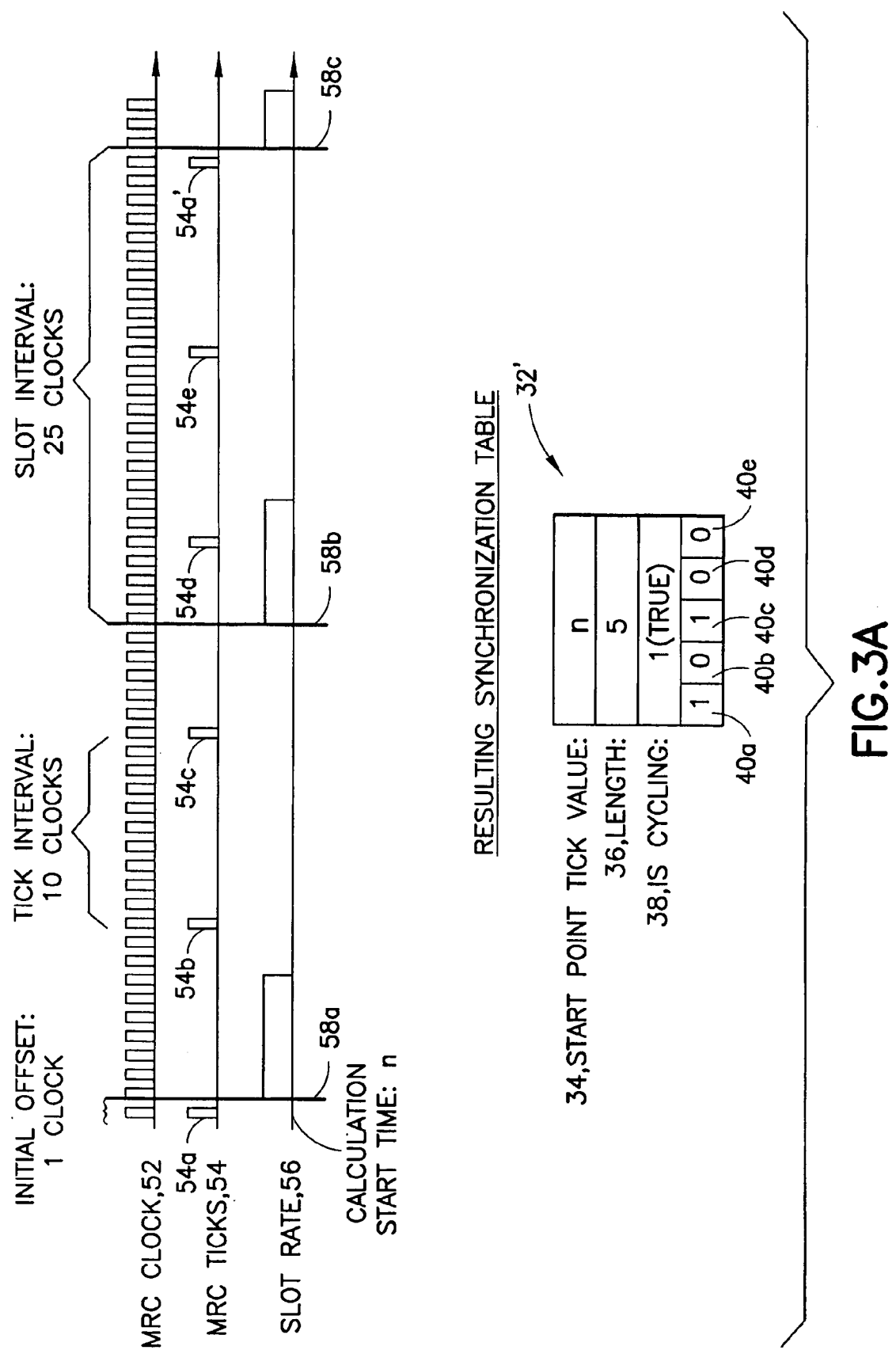
FIG. 3A illustrates a timing diagram and a resulting synchronization table following the format shown in FIG. 2 for one modem according to an exemplary embodiment of the invention for one type of network scheduling architecture.

FIG. 3A is an example of how the fields in a synchronization table 32 may be computed by the SSC 18. The timing diagram at the top of the FIG. 3A shows an MRC clock 52 and MRC ticks 54 spaced at intervals of ten clock cycles. A convenient interval for the MRC ticks 54 may be chosen based on the slot intervals of the various networks accessed by the multiradio device 10, or an arbitrary integer may be used with some minimal increase in SSC calculation. The slot border beacon 22 from one of the modems indicates to the SSC where the slot boundaries are located for that modem's network, which in the timing diagram at the top of FIG. 4 are plotted as 58a, 58b and 58c. If the slot border beacon 22 is not present in a system described herein, the same information may be extrapolated from the activity signals. In that case, the slot border measurement requires modem traffic. Note that the modem reporting its slot boundary beacon is not reporting with reference to the MRC clock 52 or its ticks 54; the SSC 18 maps those boundaries 58a, 58b, 58c to the chosen master clock as shown in that timing diagram. Consider the start time for the synchronization table 32' being generated as indicated in the timing diagram, the first illustrated MRC clock tick 54a. Between the first tick 54a and the second 54b is a slot boundary 58a, so the slot/traffic border element field 40a corresponding to that first tick 54a is set with bit-on in the synchronization table 32'. Between the second tick 54b and the third tick 54c are no slot boundaries, so the slot/traffic border element 490b corresponding to that second tick 54b is bit-off. A second boundary 58b lies between the third 54c and fourth 54d ticks, so the corresponding slot/traffic border element 40c is bit-on. No boundaries lie between the fourth 54d and fifth 54e ticks, nor between the fifth tick 54e and the next subsequent tick 54a', so those respective corresponding slot/traffic border fields 40d, 40e are set bit-off. Since in this instance the tick interval was set at ten cycles of the MRC clock 52, which is convenient for this network's slot interval of 25 cycles of the MRC clock 52 (recognizing that the network is not timed to the MRC clock 52), the synchronization table 32' can repeat, so its cycling field 38 is set bit-on to indicate cycling. The cycle repeats after five MRC ticks 54, because five MRC ticks 54 correspond exactly to two full slot intervals of the network. Therefore, there are five slot/traffic border elements 40a to 40e, and the next subsequent MRC tick 54a' corresponds to the first slot/traffic border field 40a. The synchronization table 32' is generated and re-used cyclically until a change is received from the network. Such a change will typically arise not from a different slot interval, but from changing peers/controlling entities in the network so that the boundary under the new peer/entity is not exactly aligned with that of the former peer/entity. A slip of one MRC cycle 52 would cause a new table to be generated with different entries in the slot/traffic boundary fields 40a-40e, though the table length 36 and cycling 38 fields may be regenerated with the same values as before. The slot rate 56 here represents the maximum granularity of the selected radio network's physical data elements. If a traffic element cannot be segmented anymore in a modem, it can be labeled as a 'slot'. MRC tick rate 54 is selected so that for any modem in the Multiradio device the tick interval is smaller than slot interval.

As will be appreciated, the synchronization table 32' maps a set of timeslots (indicated by the boundaries 58a, 58b, 58c) for one of the modems 20a, 20b, 20c to a selected master clock, in this case the ticks 54a to 54e of the MRC 12. FIG. 3A shows that the MRC 12 knows, by reading the synchronization table written by the SSC 18 to the memory 14, exactly when a slot border happens in a modem. By logging specific and deterministic delays between the slot border 58a, 58b, 58c and a related MRC tick 54a-54e to a register, the precise instant of the border slot time is known to the individual MRC clock cycle 52. In refined embodiments, then overlapping periods of authorized transmit/receive activity can be plotted against one another rather than the less precise authorized slot intervals in order to determine whether an overlap occurs.

Now consider the scheduling table 42, of which an exemplary format is shown in FIG. 4. Certain fields are similar to those in the synchronization table 32 of FIG. 2. Specifically, the scheduling table 42 consists of an initial tick field 44, table size field 46, cycling field 48, and a number of tx allowed/blocked 50a to 50y and rx allowed/blocked 502a to 52y field pairs that equals the value in table size field. These field pairs originate the tx allow/inhibit signal 28 and the rx allow/inhibit signals 30 described with reference to FIG. 1. The initial tick field 44 tells the absolute time value at which this scheduling table 42 becomes valid. The table size field 46 indicates how many traffic element border field pairs 50a/52a to 50y/52y there are in this table. The cycling field 48 indicates whether the table is valid after the time instant initial tick+table size has passed. If the table is cycling, it can be used indefinitely. Unlike the synchronization table 32, if the scheduling table 42 is not cycling, the last table value pair 50y/52y remains as the modem's scheduling state until a new schedule is set. For example, if a scheduling table 42 is non-cycling and the last value pair is rx allowed, tx blocked, the modem to which this scheduling table applies is not allowed to transmit at all until a new schedule is generated. The tx allowed field (50a to 50y) indicates whether the MRC 12 allows this modem to transmit at the slot corresponding to the position of that tx allowed field (50a to 50y). The rx allowed field (52a to 52y) indicates whether the MRC 12 allows that modem to receive during the slot corresponding to that field's position.

Figure 5:
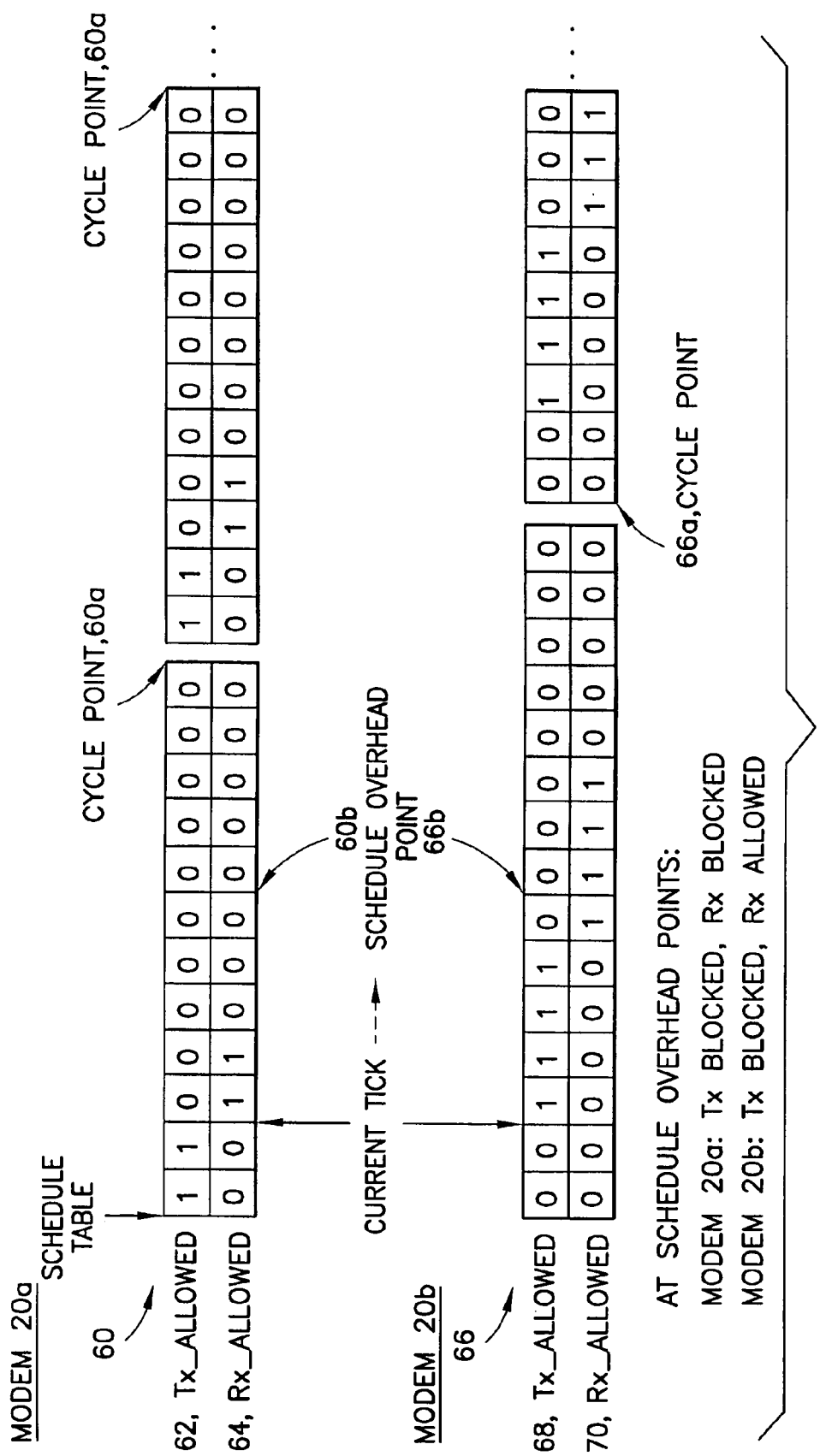
FIG. 5 illustrates two scheduling tables following the format of FIG. 4 for two of the modems of FIG. 1 according to an exemplary embodiment of the invention.

At FIG. 5 is shown the tx allow/inhibit signals 28 and the rx allow/inhibit signals 30 described with reference to FIG. 1 as drawn from two distinct scheduling tables 42. In this example the scheduling tables 42 for a first modem 20a and a second modem 20b each repeat. A first modem 20a has one cycling schedule, which as shown repeats every twelve MRC ticks. There are then twelve field pairs in its corresponding scheduling table 42. The illustrated bit sequence 60 for the first modem have pairs of tx and rx signals from the SSC 18, and represent those signals as sent seriatim to the first modem 20a. The bits in the tx allowed row 62 represent the tx allow/inhibit signals 28 from FIG. 1, with bit-on (1) indicating that transmission is allowed from that modem during the slot corresponding to that bit position, and bit-off (0) indicating inhibit transmission for that first modem during the corresponding slot. Similarly for the rx allowed row 64, which represents the rx allow/inhibit signals 30 of FIG. 1 for receive functions of the first modem 20a. It is seen that the bit sequences repeat after each cycle point 60a for the first modem 20a.

The illustrated bit sequence 60 for the second modem 20b of the same device 10 has another cycling schedule, which is seen to repeat each fifteen MRC ticks meaning that there are fifteen tx/rx pairs in its underlying scheduling table 42. Both bit sequences 60, 66 have a schedule overhead value, which they use to compensate the latencies in the system during traffic scheduling and thereby eliminate the bus arbitration problem. At the schedule overhead point 60b of the first modem 20a, it is seen that transmission and reception is inhibited for the first modem 20a, transmission is inhibited for the second modem 20b and reception is allowed for the second modem 20b. The same allow/inhibit signals are set for the scheduled overhead point 66b of the second modem 20b. The bit sequences 60, 66 are aligned in time vertically according to MRC ticks. It can be seen that with two exceptions there is no bit-on set for the same MRC tick for two rows 62, 64, 68, 70. Such is a simple embodiment: no two authorized/network scheduled slots are enabled at the same time, at least for potentially interfering modems. For that simple case, in all instances where a transmission or reception is allowed, all other instances of transmission and reception are inhibited by a bit-off in the tx or rx allowed signal. A reverse bit convention may also be used.

In some embodiments it may not be necessary to inhibit both transmission and reception of one modem in response to allowing an authorized transmission and/or reception on another modem; the invention may restrict only those instances of reception and/or transmission that would interfere with another modem's transmission and/or reception if allowed. This is illustrated at the first two ticks following the "current tick" notation in FIG. 5, and is particularly pertinent when one or both networks associated with the otherwise overlapping modems use different frequency bands for transmit and receive functions. In each of those two ticks, the first modem 20a is enabled to receive and the second modem 20b is enabled to transmit. In this instance, reception on the first modem 20a is not potentially interfering with transmission from the second modem 20b, such as due to a frequency separation between those different bands. Only overlap of two active instances that are potentially interfering need be restricted; else authorized transmit and receive slots go unused for no true gain. Further to frequency interference, the allow/inhibit signals 28, 30 may also be used to inhibit conflicting use of hardware in the device, such as where two modems share an antenna that is not configured for simultaneous operation over two different frequencies that the two sharing modems may use. Each of these variations is more specific to device hardware and the variances as between different networks. The more broad-based embodiments, not specific to a device or the networks on which its modems operate, are those that inhibit all transmit/receive activity whenever there is an overlapping authorized timeslot among different modems, except for either transmit or receive activity for one of the modems.

Figure 6A:
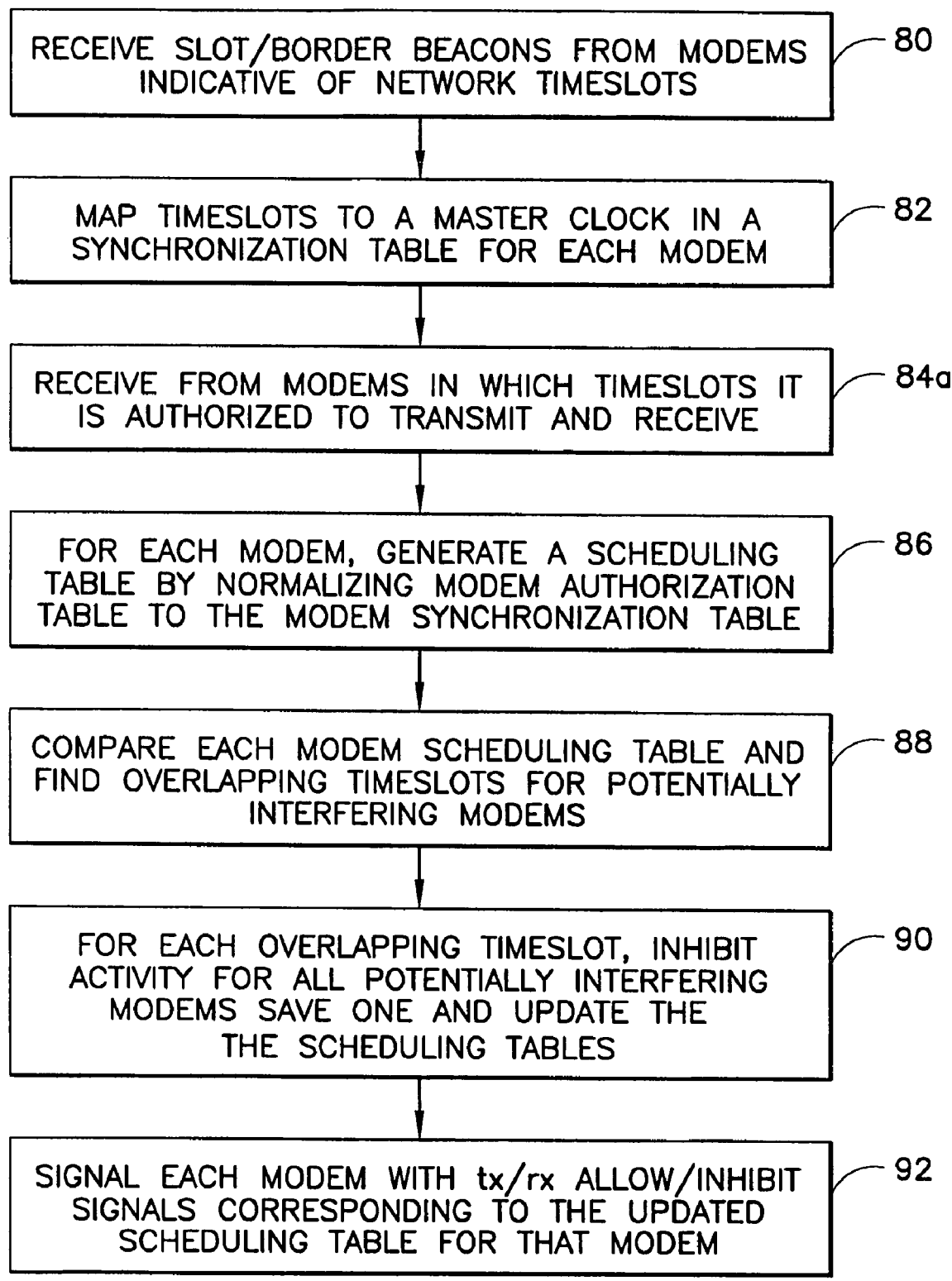
FIG. 6A illustrates process steps for synchronizing and scheduling modems of a multiradio device according to an exemplary embodiment of the invention where modem traffic authorization pattern is generated by measuring modem behavior.
Figure 6B:
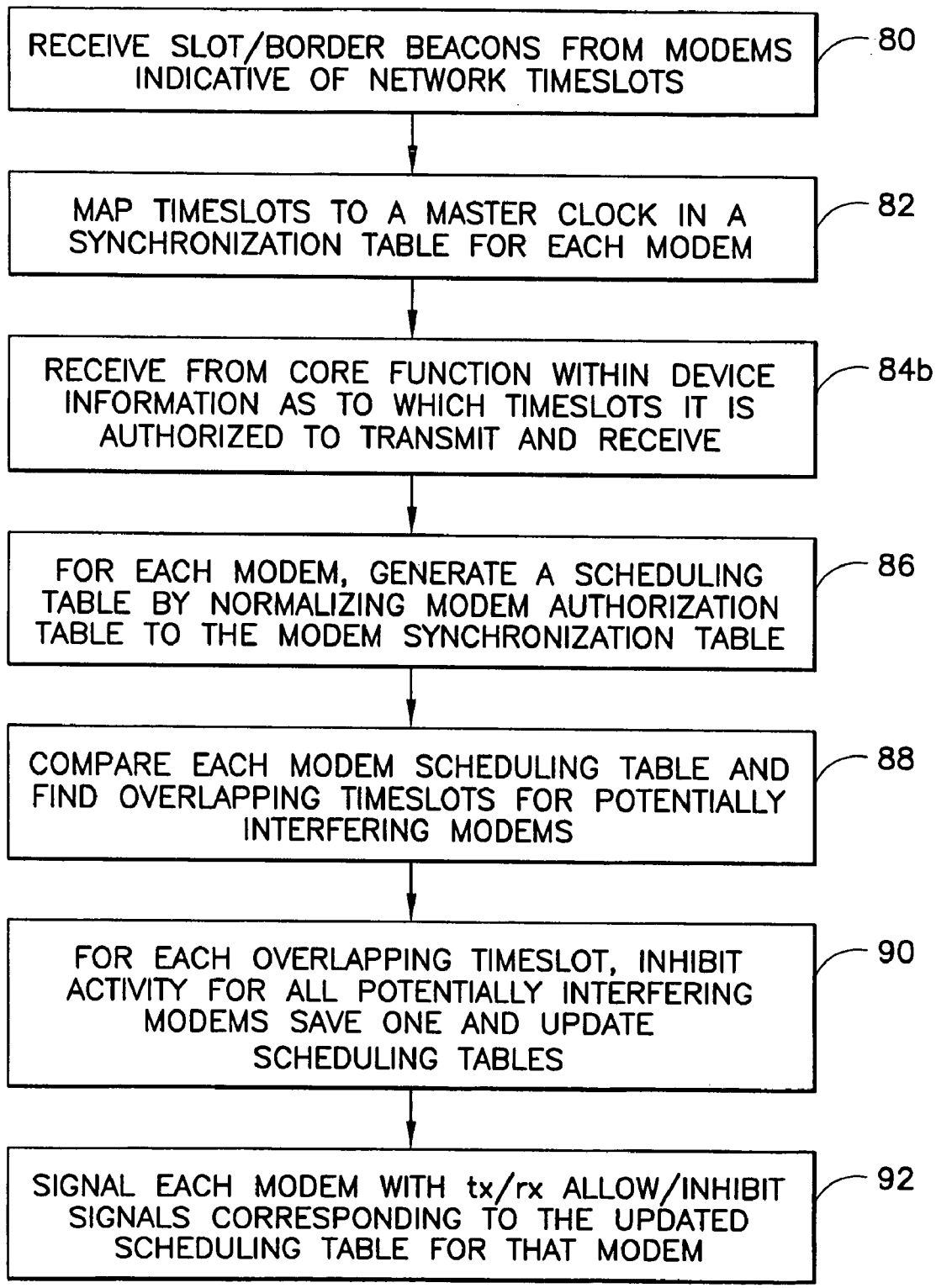
FIG. 6B illustrates process steps for synchronizing and scheduling modems of a multiradio device according to an exemplary embodiment of the invention where modem traffic authorization pattern is received from an existing storage in the device.

FIG. 6A shows process steps according to a particular embodiment where a modem provides the MRC its traffic authorization information. FIG. 6B shows a similar set of process steps in a system where a modem's authorization pattern is known already in the MRC during modem connection setup. At block 80, the SSC 18 receives a slot border beacon from each of the modems, which indicate the timeslot boundaries for the network on which that modem is currently communicating. At block 82, the SSC maps the timeslot information received at block 80 to a master clock, such as the MRC clock seen in FIG. 3A to which the MCU 12 is synchronized, thereby generating the synchronization tables 42. At block 84a, the SSC 18 receives from each modem information concerning which timeslots the network has authorized the modem to transmit and to receive, generically those timeslots in which the subject modem is authorized to be active. Using the information of block 84a, at block 86 the SSC 18 generates for each modem a scheduling table of authorized activity, though this is not yet the described scheduling table. The SSC may load this non-final scheduling table into its internal buffer prior to sending an updated version to the memory 14. The scheduling tables from block 86 are normalized to the synchronization tables. The scheduling tables are compared at block 88 and overlapping timeslots for potentially interfering modems are found. The tables are normalized using the MRC tick domain as described as well as the scheduled overhead point, so this normalization may be done in part at least at block 82 where the tick domain is used rather than merely mapping to the MRC clock directly. At block 90, the scheduling tables from block 86 are updated to inhibit activity for all potentially interfering modems for each of the potentially interfering timeslots from block 88. This is preferably written to both the SSC 18 internal RAM 18a and the memory 14 that is directly accessible by the MCU 12. At block 92, the SSC 18 signals each modem with the transmit allow/inhibit signals and receive allow/inhibit signals seen in FIG. 1. Those signals are drawn directly from the tx/rx field pairs of the updated scheduling tables according to the embodiments detailed above.

In the transmission/reception allocation architecture which uses operation steps shown in FIG. 6A, the SSC monitors modem signals 24 and 26 for a duration determined by the MRC as indicated at step 84a, one measurement per positive beacon border edge. The SSC places the raw measured information in table 42 that is located in the common memory 14. The starting instant of the measurement is placed in the initial tick-field 44. The duration of the measurement is placed in the table size-field 46. Is cycling-field 48 is set to 'false'. For each slot border beacon 22, the value in the tx active 24 and rx active 26 signals are placed in table slots 50 and 52 respectively. At the first border beacon 22 after the measurement start the tx and rx activity values are placed in 50a and 52a, at second beacon in 50b and 52b and so on until as many beacons have been received as indicated by the table size-field 46. When the measurement period is over the MRC seeks a repeating pattern from the information in table 42. When the pattern is found, the table size-field is set to the size of the repeating pattern, the is cycling-field 48 is set to 'true' and the fields in table 42 starting from 50x, 52x, where x is greater than the value in table size-field are discarded. The SSC can now use the table 42 as a valid authorization table.

In the transmission/reception allocation architecture which uses operation steps shown in FIG. 6B, the monitoring routine described in the previous paragraph is not necessary. The authorization table is received from the element that configures MRC or alternatively from a database within MRC at step 84b.

During the step 86 MRC core functions map the authorization tables 42 for each modem connection to the modem's synchronization table 32. This method can be used, for example, for the Bluetooth protocol and shown in FIG. 3B. As an example case, Bluetooth data may be sent over an HV3 link, which is an SCO (synchronous connection oriented) type of link that partitions traffic into groups of slots (six slots shown in FIG. 3B). Slots 1, 3 and 5 are data transmission slots for the master device, and slots 2, 4 only one slave device. In HV3, slot 1 is used by the master device to send data to the slave device, slot 2 is used by the slave device to send data to the master device, and the remaining slots 3-6 are not used, unless/until other slave devices are added to this network. This pattern repeats every six slots. Whether master or slave, there is no signaling over the network for each authorized transmission or reception slot. What is transmitted is the network timing so that devices/modems on the network can synchronize their six-slot patterns, but each device knows its designated slot to transmit and receive once the Bluetooth connection is set up. The transmission allocation pattern that indicates which device transmits and receives in which slots is stored in a local memory.

Figure 3B:
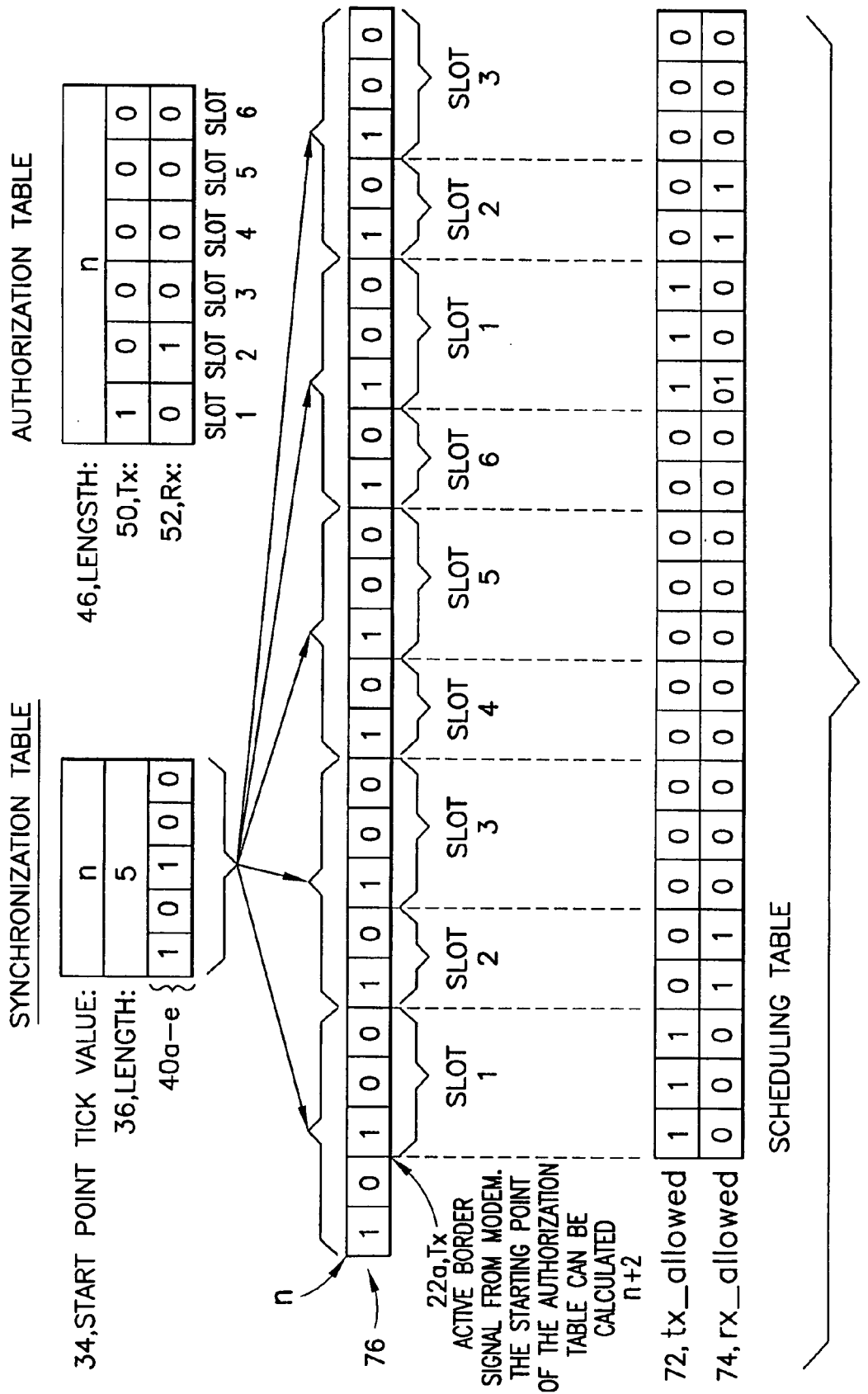
FIG. 3B is similar to FIG. 3A, but showing another exemplary embodiment of the invention for a different type of network architecture as compared to FIG. 3A.

FIG. 3B shows that authorization table for the master device using the master/slave example given above: transmit is allowed (bit=1) and reception is inhibited (bit=0) in slot 1 since that is when this master is allowed to transmit to the (single) slave, reception is allowed and transmission is inhibited in slot 2 since that is when the slave is authorized to transmit to this master, and slots 3-6 are not used and are therefore inhibited. The initial tick field 44 and cycling field 48 are not shown in this authorization table though they may be included in an embodiment. The resulting synchronization table is shown, with the cycling field 38 not shown (in this type of network allocation structure, the table would always cycle until replaced, such as when a new slave joins the network). There are five border elements 40a-e that cycle every tick, shown in the tick diagram 76 as repeating.

Assume the connection is setup at tick=n and slot 1 begins at tick=n+2, shown as a transmission active signal 22a for the master device/modem. The border elements 40a-e repeat each five ticks. The bit sequences for transmission 72 and reception 74 are shown aligned with the tick diagram 76. In slot 1 for this master device, transmission is allowed (bit=1) and reception is inhibited (bit=0) for the three ticks that span slot 1, following the first tx/rx pair of the authorization table that correspond to slot 1. Slot 2 spans two ticks, and the second pair of tx/rx bits from the authorization table are repeated in the sequences 72, 74 across those two ticks so as to span all of slot 2. Slots 3-6 are all inhibited for transmission and reception, consistent with the tx/rx pairs corresponding to those slots in the authorization table. The transmission 72 and reception 74 bit sequences then repeat at the next tick in the tick diagram 76, which corresponds to the next instance of slot 1 in that network.

As stated earlier, a similar procedure 86 is repeated for each modem connection. When the step 86 is completed, SSC has a scheduling table (such as in the bottom of FIG. 3B) for each modem. These scheduling tables may vary in their sizes, starting values and patterns. However, they now all share a common time reference (MRC tick) and thus may be compared with each other as shown in FIG. 5.

Because embodiments of this invention resolve and prevent interference among modems operating on disparate networks, the different aspects of FIGS. 6A and 6B can be readily combined into one embodiment, where one modem operates in a first network allocating on a per-transmission basis (FIG. 3A) and another modem operates in a second network allocating according to a repeating schedule that is authorized upon connection setup (FIG. 3B).

Following are some implementation details that may be present in various embodiments. The connection between the SSC 18 and the memory 14 may be via the illustrated bus 16 or it may be direct. Latencies can be non-deterministic, only a maximum delay need be known as in the above detailed embodiments. The connection with the modems needs to be such, that all signals to and from SSC have a known delay, which is accounted for in the signals 28, 30 sent to the specific modem 20a, 20b, 20c.

The SSC 18 may be considered to functionally maintain the master clock tick domain, which in FIG. 3A is an MRC tick 54. As above, the tick is a time unit (in the MRC 12) to which all the modems' behavior is mapped for purposes of synchronizing under embodiments of this invention. As above, the synchronization table's traffic element border fields 40a-40x represent the modem's status during a single tick. The SSC 18 generates the synchronization table 32 by monitoring the signals 22, 24, 26 that it receives from the modems 20a, 20b, 20c. The synchronization table 32 is written to the common memory 14, from where MRC 12 core functions may read it.

The SSC 18 also schedules each modem with the tx allow/inhibit signals 28 and rx allow/inhibit signals 30, which are drawn from the scheduling table 42 for that modem. The scheduling table 42 may be generated by the MRC core functions and written to the common memory 14. The SSC may reads the table—or a piece of it—to its internal buffer 18a. An internal buffer 18a is advantageous, because the information needed to schedule the modems needs to be available immediately during the scheduling operation. The buffer control 18b inside the SSC 18 maintains valid scheduling information in the buffer 18a while the schedule routine (in hardware, software, or a combination) signals each modem their current schedule statuses, the signals 28, 30. The statuses are acquired by looking in the scheduling tables 42 at the index, where current time (or current tick, see FIG. 5) equals the table's initial tick (field 44), plus the traffic element border field index (the current one of the tx/rx pairs 50a/52a to 50y/52y), plus the modem's schedule overhead value. The schedule overhead value is modem-specific and is used to compensate any known latencies caused in the system by the relative interconnections of the SSC 18 to the modems 20a, 20b, 20c. Since these latencies are relatively fixed once the device 10 is assembled, it need be computed only once for each different type of device 10 into which an otherwise generic SSC 18 ASIC/ASIP is installed, so bus arbitration is easily addressed for different type multiradio devices 10.

The foregoing portion of the description is reproduced from related U.S. patent application Ser. No. 11/647,620 filed on even date herewith and entitled "Multiradio Synchronization and Scheduling Control" which concerns synchronizing operations performed by multiple modems of a multiradio device. The foregoing description presupposes the availability of scheduling information. Once the modems of a multiradio device have been synchronized with respect to a common clock reference in accordance with the foregoing methods and apparatus, a schedule controlling communication operations performed by the multiple modems of the multiradio device can be implemented with accuracy since timing uncertainties and inaccuracies resulting from lack of synchronization have been reduced or eliminated. The following methods and apparatus, which can be practiced alone or in combination with the foregoing methods and apparatus, concern controlling concurrent operations of modems of a multiradio device so that messaging collisions are avoided, while allowing compatible operations to be performed concurrently by multiple modems of a multiradio device. In other words, the following description disclose methods and apparatus for generating scheduling information to be used, for example, in the foregoing methods and apparatus.

Figure 7:
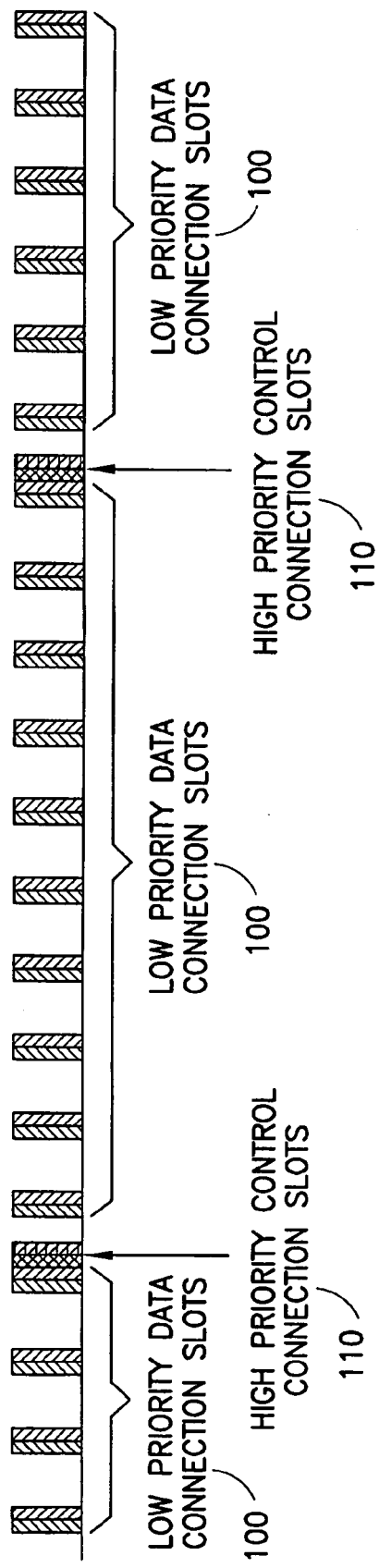
FIG. 7 depicts operations associated with a Bluetooth connection that are relevant to the invention.

In embodiments of this aspect of the invention, messages associated with particular modems of a multiradio device are each assigned a priority and at least one connection property to be used in controlling access to a common communications channel when modems associated with the multiradio device seek to perform communication operations involving the messages. The communication operations typically comprise at least one of transmitting and receiving the messages. In a typical embodiment, a modem may be used to perform operations with respect to two distinct messages or message streams. In such an instance, each message or message stream associated with a particular modem will be assigned a separate priority and at least one separate connection property. An example of such an instance is depicted in FIG. 7. A Bluetooth modem has a data connection 100 with a best-effort quality of service requirement. It also has a control connection 110 with a high quality of service requirement. The data connection packets can be lost and retransmitted indefinitely, but the control connection packets must meet certain throughput requirements. If these requirements are not met, the entire link with the peer device is severed and re-established. In embodiments of the invention, the connections 100 and 110 would be assigned separate priorities and connection properties; these would then be used to control operations performed by the modem involving the connections. For the purpose of the following description "connection"; "message" and "message stream" are used interchangeably.

Figure 8:
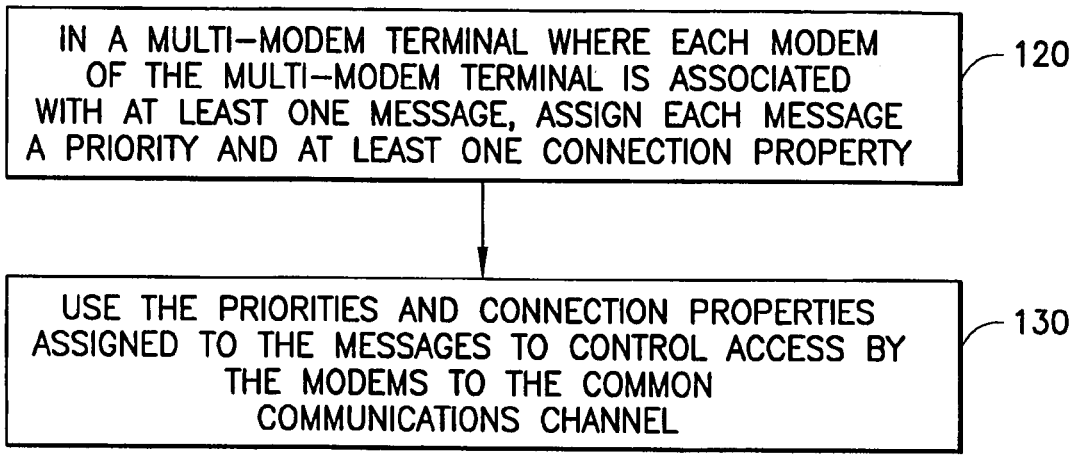
FIG. 8 is a flowchart depicting a method for controlling access to a common communications channel by modems of a multiradio terminal in accordance with the invention.

FIG. 8 is a flow chart depicting a method operating in accordance with the invention. The method occurs in a multi-modem terminal where each modem of the multi-modem terminal is associated with at least one message. At step 120, each message is assigned a priority and at least one connection property. Then, at step 130, the priorities and connection properties assigned to the messages are used to control access by the modems to a common communications channel. "Controlling access to a common communications channel" can mean several things with respect to the invention. For example, a modem may be denied access to the common communications channel when concurrent signaling activities with another modem would create a collision. Alternatively, the modem may be denied access to the common communications channel when no collision would result but when there is a communication resource hardware conflict.

In one variant of the method depicted in FIG. 8, an additional step is performed with respect to modems of a multi-modem terminal that are synchronized to different clock references. In the method a step of synchronizing operations of the modems to a common clock reference is performed when controlling access by the modems to the common communications channel. The step can be performed in accordance with the foregoing methods.

In another variant of the method depicted in FIG. 8, the step of using the using the priorities and connection properties assigned to the messages further comprises: using the connection properties assigned to the messages to determine when concurrent operations by different modems of the multi-modem terminal are not possible; and using a pattern masking procedure to schedule access by the modems to the common communications channel, wherein the pattern masking procedure is used to schedule access to the common communications channel so that concurrent use of the common communications channel by the modems is prevented.

Figure 9:
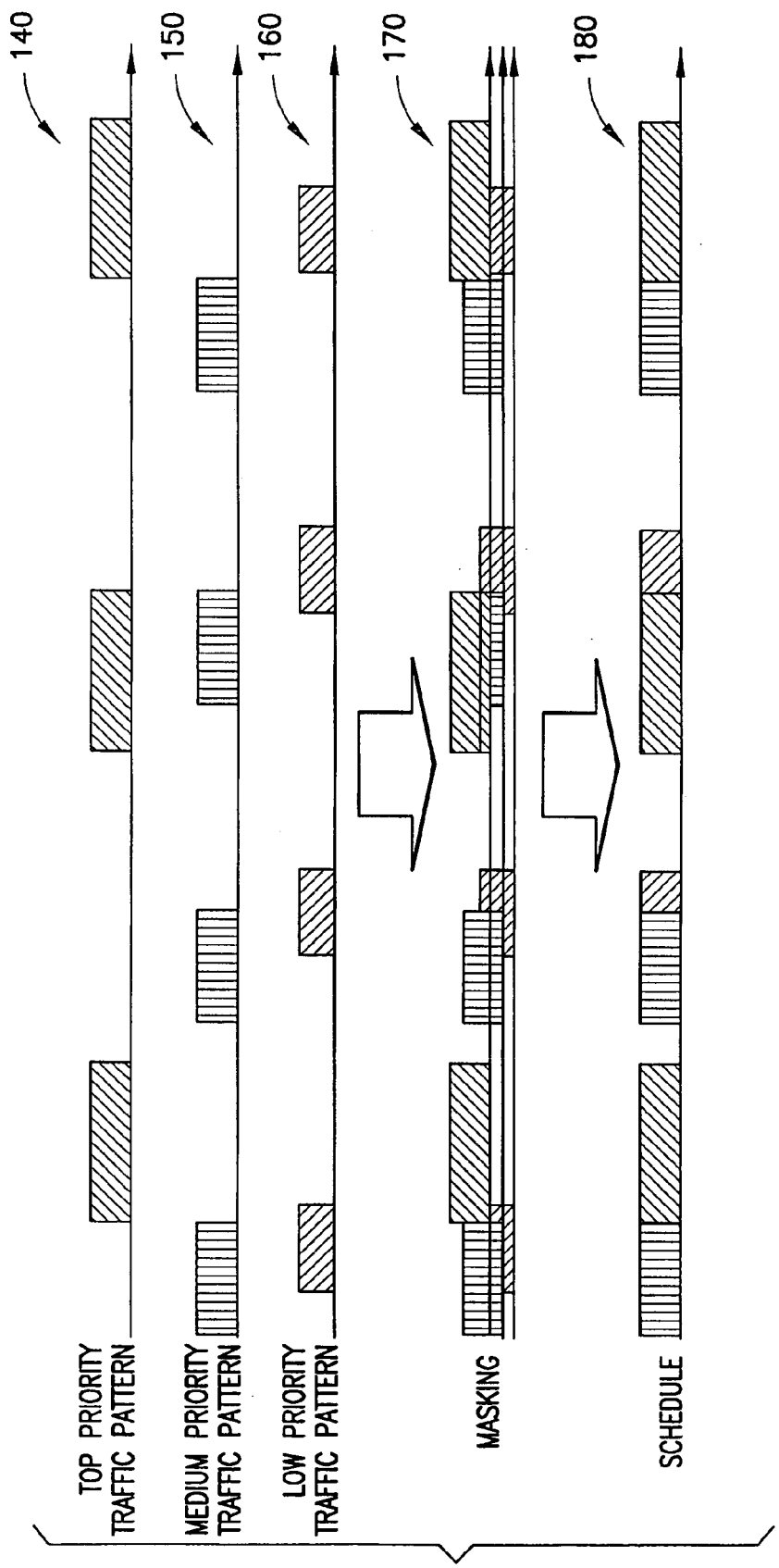
FIG. 9 depicts operations of a pattern masking procedure for use in controlling access to a common communications channel by modems of a multiradio terminal in accordance with the invention.

The operations of a pattern masking procedure are depicted in FIG. 9. FIG. 9 depicts a procedure for controlling access to the communications channel when only a single modem (whether receiving or transmitting) is permitted to access the common communications channel. The pattern masking procedure can be implemented in several ways. For example, in one embodiment, a modem access control unit is configured to control access to the common communications channel using the pattern masking procedure. When the modem access control unit receives a request by a modem to access the communications channel, the modem access control unit determines if any other modems are currently using the communications channel. If so, the modem access control unit determines the relative priorities of messages being operated on by the modems. The modem associated with the higher priority message is permitted access to the communications channel, whereas the modem associated with the lower priority message is denied access to the communications channel. In one situation this may result in the preemption of a modem currently using the communications channel if another modem associated with a message having a relatively higher priority is seeking access to the communications channel. Alternatively, if the modem currently using the communications channel is performing operations involving a higher priority message than the other modem seeking access to the communications channel, the modem seeking access to the communications channel will be prevented from accessing the communications channel.

FIG. 9 is a somewhat more complicated example where three modems are seeking access to the common communications channel. Several traffic patterns are being supported by the separate modems—a top priority traffic pattern 140; a medium priority traffic pattern 150; and a low priority traffic pattern 160. For each instant in time, the pattern masking procedure determines the traffic pattern with the highest priority as shown by 170. The resulting schedule 180 permits only the highest priority traffic pattern seeking access to the communications channel at any instant in time to actually access the communications channel. It should be noted from FIG. 9 that to the extent that there is not a conflict between time slots sought by the modems, the modems will be granted access to the common communications channel.

In a variant of the method using a pattern masking procedure additional steps may be performed to determine whether concurrent access to the common communications channel can be permitted. In this variant, the additional steps of consulting a traffic rule matrix to determine whether connection properties associated with messages seeking concurrent access to the common communications channel are compatible; and granting concurrent access only when it is determined that the connection properties assigned to the two different messages are compatible.

Figure 10:
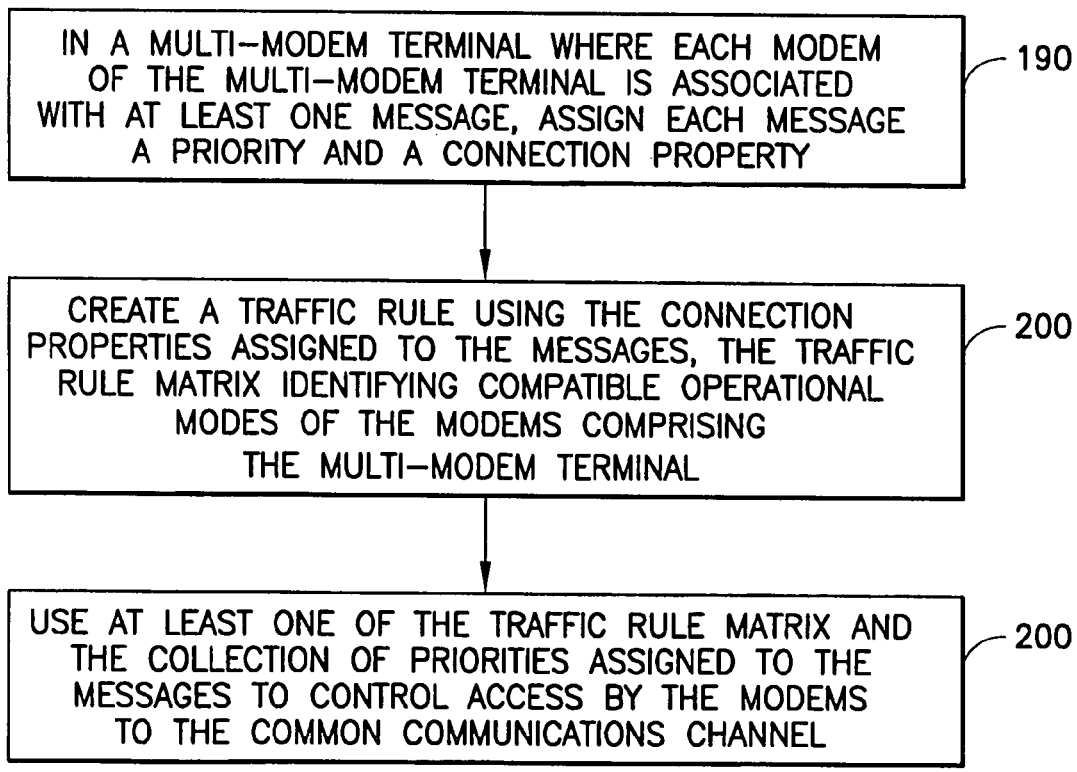
FIG. 10 is a flowchart depicting a method for controlling access to a common communications channel by modems of a multiradio terminal in accordance with the invention.

Another method operating in accordance with the invention depicted in FIG. 10 describes this aspect of the invention in greater detail. Again, the method is assumed to operate with reference to a multi-modem terminal where each modem of the multi-modem terminal is associated with at least one message. At step 190, each message is assigned a priority and at least one connection property, the assigned priorities comprising a collection. Then, at step 200, a traffic rule matrix is created using the connection properties assigned to the messages. The traffic rule matrix identifies compatible operational modes of the modems comprising the multi-modem terminal. An "operational mode" of the modem corresponds to the characteristics and properties assumed by the modem when it is performing operations in accordance with connection properties assigned to a message or connection. Next, at step 210, at least one of the traffic rule matrix and the collection of priorities assigned to the messages is used to control access by the modems to the common communications channel. Depending on the method it may not be necessary to use both.

A traffic rule matrix is decision matrix incorporated in software, hardware, or a combination of software and hardware indicating how access to a communications channel is to be controlled. In FIG. 11, three modems are represented, with their Tx and Rx sides represented as separate entities. The table depicted in FIG. 11 is configurable and shows which modems and their corresponding Tx and Rx aspects can operate concurrently. A "1" indicates that concurrent operation is supported, whereas a "0" indicates that concurrent operation is not supported. The traffic rule matrix can be made even more complex when a modem is used to perform communication operations with respect to several messages having different connection properties. In such an instance, the modem may have multiple Tx (transmitting) operational modes or multiple Rx (receiving) operational modes.

In one variant of the method depicted in FIG. 10, the step 210 of using at least one of the traffic rule matrix and the collection of priorities further comprises using a pattern masking procedure reflecting the priorities. Typically, the pattern masking procedure would prevent concurrent use of the communications channel by the modems when there is a conflict. In another variant of the method depicted in FIG. 10, the pattern masking procedure prevents a modem seeking to perform an operation involving a relatively low priority message from accessing the common communications channel when another modem is already scheduled to use the common communications channel to perform an operation involving a relatively high priority message.

In a further variant of the method depicted in FIG. 10 based on pattern masking additional steps are performed. In a first additional step, requests are received from at least a first and a second modem of the plurality, wherein each of the requests specifies a time slot when the communications channel is required. In a second additional step, it is determined whether the time slots specified by the requests received from the first and second modems overlap. In a third additional step, if it is determined that the time slots do not overlap, the first and second modems are permitted to use the communications channel during the time slots specified in their respective requests. In further additional steps, if it is determined that the time slots do overlap, an overlapping time period is determined from the time slots specified in the respective requests; the priorities assigned to the messages associated with the first and second modems are compared; and for the overlapping time period, the modem of the first and second modems associated with a message having a higher priority is allowed to use the communications channel; and the modem of the first and second modems associated with the message having the lower priority is prevented from using the communications channel.

Another variant of the method depicted in FIG. 10 operates using a traffic rule matrix. In this variant, step 210 of using at least one of the traffic rule matrix and the collection of priorities further comprises: generating the traffic rule matrix to control access to the common communications channel, wherein the traffic rule matrix reflects the connection properties assigned to each of the messages associated with the modems; and using the traffic rule matrix to control access by the modems to the common communications channel. Typically the traffic rule matrix would permit concurrent use of the common communications channel by at least some of the modems.

In a further embodiment of the method depicted in FIG. 10 using a traffic rule matrix, generating a traffic rule matrix further comprises evaluating the connection properties assigned to each of the messages associated with the modems; and determining from the properties which modems can use the communications channel concurrently with acceptable results. Essentially this method determines which combinations of modem operations and messages are compatible. Once "compatible" modems are determined, the modems having compatible operational modes are allowed to access the communications channel concurrently.

In a still further variant of the method depicted in FIG. 10, the step of using at least one of the traffic rule matrix and the collection of priorities assigned to the messages to control access to the communications channel further comprises: receiving requests from at least first, second and third modems, wherein each of the requests specify a time slot for which access to the common communications channel is sought; and a particular message for which access to the common communications channel is sought; determining whether the time slots specified in the requests received from the first, second and third modems conflict; if it is determined that the time slots do conflict, further determining that the priority associated with the message specified in the request received from the first modem is highest as among priorities assigned to messages specified in requests received from the first, second and third modems; granting access to the common communications channel to the first modem during the time slot requested by the first modem; determining from the messages specified in the requests operational modes to be used by the first, second and third modems when accessing the common communications channel to perform operations involving their respective messages; consulting the traffic rule matrix to determine whether the operational modes of the second and third modems are compatible with the operational mode of the first modem; and if it is determined that the operational modes specified in the requests received from the second and third modems are not compatible with the operational mode specified in the request received from the first modem, denying access to the common communications channel to the second and third modems to the extent that the time slots specified in the requests received from the second and third modems conflict with the time slot specified in the request received from the first modem.

In yet another variant of the method depicted in FIG. 10, the step of using at least one of the traffic rule matrix and the collection of priorities assigned to the messages to control access to the communications channel further comprises: receiving requests from at least first, second and third modems, wherein each of the requests specify a time slot for which access to the common communications channel is sought; and a particular message for which access to the common communications channel is sought; determining whether the time slots specified in the request received from the first modem conflict with requests received from the second and third modems; if it is determined that the time slots do conflict, further determining that the priority associated with the message specified in the request received from the first modem is highest as among priorities assigned to message streams specified in requests received from the first, second and third modems; granting access to the common communications channel to the first modem during the time slot requested by the first modem; determining from the messages specified in the requests operational modes to be used by the first, second and third modems when accessing the common communications channel to perform operations involving the messages; consulting the traffic rule matrix to determine whether the operational modes of the second and third modems are compatible with the operational mode of the first modem; if it is determined that the operational modes of the second and third modems are compatible with the operational mode of the first modem, further determining whether the time slots specified in the requests received from the second and third modems conflict; and if the time slots sought by the second and third modems do not conflict with one another, granting access to the common communications channel to each of the first, second and third modems during the time slots respectively sought by each of the first, second and third modems.

In another variant of the method depicted in FIG. 10, the step of using at least one of the traffic rule matrix and the collection of priorities assigned to the messages to control access to the communications channel further comprises: receiving requests from at least first, second and third modems, wherein each of the requests specify a time slot for which access to the common communications channel is sought; and a particular message for which access to the common communications channel is sought; determining whether the time slots specified in the request received from the first modem conflict with requests received from the second and third modems; if it is determined that the time slots do conflict, further determining that the priority associated with the message specified in the request received from the first modem is highest as among priorities assigned to messages specified in requests received from the first, second and third modems; granting access to the common communications channel to the first modem during the time slot requested by the first modem; determining from the messages specified in the requests operational modes to be used by the first, second and third modems when accessing the common communications channel to perform operations involving the messages; consulting the traffic rule matrix to determine whether the operational modes of the second and third modems are compatible with the operational mode of the first modem; if it is determined that the operational modes of the second and third modems are compatible with the operational mode of the first modem, determining whether the time slots specified in the requests received from the second and third modems conflict with one another; if it is determined that the time slots specified in the requests received from the second and third modems conflict, further determining whether the operational modes of the second and third modems are compatible; and if the operational modes of the second and third modems are not compatible, granting access to the common communications channel during the conflicting portion of the time slots sought by second and third modems to the modem of the second and third modems associated with the message having the highest priority.

In general, the various embodiments of the device 10 can include, but are not limited to, cellular phones, cellular communicators, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Embodiments of this invention may be implemented in part or in whole by computer software executable by a data processor such as the SSC 18 or the MCU 12 of the device 10, or by hardware, or by a combination of software and hardware. Such software may be embodied on a computer readable medium such as the memory 14 or an internal memory of the SSC (in addition to the buffer 18a), and when executed by an associated data processor enable the multiradio device 10 to operate in accordance with the exemplary embodiments of this invention.

The memory 14, 18a may be of any type suitable to the local technical environment and may be implemented using any suitable data storage technology, such as semiconductor-based memory devices, magnetic memory devices and systems, optical memory devices and systems, fixed memory and removable memory. The processor MCU 12 and/or SSC 18 may be of any type suitable to the local technical environment, and may include one or more of general purpose computers, special purpose computers, microprocessors, digital signal processors (DSPs) and processors based on a multi-core processor architecture, as non-limiting examples.

Based on the foregoing it should be apparent that the exemplary embodiments of this invention provide a method, apparatus and computer program product to map a first set of timeslots for a first modem of a device to a master clock, to map a second set of timeslots for a second modem of a device to the master clock, and to inhibit at least one of transmission and reception of the first modem during a timeslot of the first set that overlaps with a timeslot of the second set.

In general, the various embodiments may be implemented in hardware or special purpose circuits, software, logic or any combination thereof. For example, some aspects may be implemented in hardware, while other aspects may be implemented in firmware or software that may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   in a multi-modem terminal where each modem of the multi-modem terminal is associated with at least one message, assigning each message a priority and at least one connection property; and
   using the priorities, the connection properties assigned to the messages, and a traffic rule matrix to control access by the modems to a common communications channel, the traffic rude matrix identifying compatible operational modes of at least first, second and third modems in the multi-modem terminal, the traffic rule matrix comprising entries for each of the first, second and third modems for the operational modes of transmission and reception, the entries indicating whether a selected modem and its corresponding operational mode is compatible with another selected modem and its corresponding operational mode.

2. The method of claim 1 wherein at least some of the modems of the multi-modem terminal are synchronized to different external clock references, the method further comprising:
   synchronizing operations of the modems of the multi-modem terminal to a common clock reference when controlling access by the modems to the common communications channel.

3. The method of claim 1 wherein at least one of the messages associated with at least one of the modems of the multi-modem terminal is to be transmitted by the at least one modem.

4. The method of claim 1 wherein at least one of the messages associated with at least one of the modems of the multi-modem terminal is to be received by the at least one modem.

5. The method of claim 1 where at least two messages are associated with at least one of the modems of the multi-modem terminal and wherein using the priorities and connection properties assigned to the messages to control access by the modems to a common communications channel further comprises using the priorities and connection properties assigned to each of the at least two messages to control access to the common communications channel by the modem associated with the at least two messages.

6. The method of claim 1 wherein using the priorities and connection properties assigned to the messages further comprises:
   using the connection properties assigned to the messages to determine when concurrent operations by different modems of the multi-modem terminal are not possible; and
   using a pattern masking procedure to schedule access by the modems to the common communications channel, wherein the pattern masking procedure is used to schedule access to the common communications channel so that concurrent use of the common communications channel by the modems is prevented.

7. The method of claim 6 wherein using a pattern masking procedure prevents a modem seeking to perform a communication operation involving a relatively low priority message from accessing the common communications channel when another modem is already using the common communications channel to perform a communication operation involving a relatively high priority message.

8. The method of claim 6 wherein using a pattern masking procedure further comprises:
   receiving requests to use the communications channel from at least a first and second modem of the plurality of modems, wherein each of the requests specifies a time slot when the communications channel is required; and
   determining whether the time slots specified by the requests received from the first and second modems overlap.

9. The method of claim 8 further comprising:
   if it is determined that the time slots do not overlap, permitting the first and second modems to use the communications channel during the time slots specified in their respective requests.

10. The method of claim 8 wherein the requests received from at least the first and second modems specify particular messages for which access to the communications channel is sought, the method further comprising:
   if it is determined that the time slots do overlap, determining from the respective requests an overlapping time period;
   comparing the priorities assigned to the messages specified in the requests received from the first and second modems; and
   for the overlapping time period, allowing the modem of the first and second modems associated with the higher priority message to use the communications channel, and preventing the modem of the first and second modems associated with the lower priority message from using the communications channel.

11. The method of claim 1 wherein using the priorities and connection properties assigned to each of the messages further comprises using a pattern masking procedure to schedule access by the modems to the common communications channel, wherein the pattern masking procedure allows concurrent use of the common communications channel by modems to perform communication operations involving at least two different messages when it is determined that the connection properties assigned to each of the at least two different messages allow concurrent operation by the modems associated with each of the at least two different messages.

12. The method of claim 11 wherein using a pattern masking procedure to schedule access by the modems to the common communications channel further comprises:
   consulting a traffic rule matrix to determine whether the connection properties associated with the two different messages seeking concurrent access to the common communications channel are compatible; and
   granting concurrent access by the modems handling the two different messages only when it is determined that the connection properties assigned to the two different messages are compatible.

13. A method comprising:
   in a multi-modem terminal where each modem of the multi-modem terminal is associated with at least one message, assigning each message a priority and at least one connection property, the assigned priorities comprising a collection;
   creating a traffic rule matrix using the connection properties assigned to the messages, the traffic rule matrix identifying compatible operational modes of the modems comprising the multi-modem terminal; and
   using at least one of the traffic rule matrix and the collection of priorities assigned to the messages to control access by the modems to the common communications channel, wherein the traffic rule matrix prevents a first modem seeking to transmit a relatively low priority message in the common communications channel when interference generated by the first modem would degrade operations of a second modem already using the common communications channel to perform operations involving a relatively high priority message, and wherein the interference would be caused by harmonics of the relatively low priority message which the first modem is seeking to transmit.

14. The method of claim 13 wherein using at least one of the traffic rule matrix and the collection of priorities assigned to the messages to control access by the modems to the common communications channel further comprises:
   receiving requests from at least first and second modems, wherein each of the requests specifies a time slot for which access to the common communications channel is sought; and a particular message for which access to the common communications channel is sought;
   determining from the messages specified in the requests operational modes to be used by the first and second modems when accessing the common communications channel to perform operations involving the messages;
   consulting the traffic rule matrix to determine whether the operational modes of the first and second modems are compatible with one another; and
   if it is determined that the operational modes of the first and second modems are compatible, granting access to the common communications channel to both the first and second modems.

15. The method of claim 13 wherein using at least one of the traffic rule matrix and the collection of priorities assigned to each of the messages to control access by the modems to the common communications channel further comprises:

receiving requests from at least first and second modems, wherein each of the requests specifies a time slot for which access to the common communications channel is sought; and a particular message for which access to the common communications channel is sought;

determining from the messages specified in the requests operational modes to be used by the first and second modems when accessing the common communications channel to perform operations involving the messages;

consulting a traffic rule matrix to determine whether the operational modes to be used respectively by the first and second modems when accessing the common communications channel are compatible with one another;

determining that the operational modes to be used by the first and second modems are not compatible with one another;

determining whether the time slots specified in the requests received from the first and second modems conflict; and if it is determined that the time slots do not conflict, granting access to the common communications channel to both the first and second modems.

16. The method of claim 13 wherein using at least one of the traffic rule matrix and the collection of priorities assigned to the messages to control access by the modems to the common communications channel further comprises:

receiving requests from at least first and second modems, wherein each of the requests specifies a time slot for which access to the common communications channel is sought; and a particular message for which access to the common communications channel is sought;

determining from the messages specified in the requests operational modes to be used by the first and second modems when accessing the common communications channel to perform operations involving the messages;

consulting a traffic rule matrix to determine whether the operational modes to be used respectively by the first and second modems when accessing the common communications channel are compatible with one another;

determining that the operational modes to be used by the first and second modems are not compatible with one another;

determining whether the time slots specified in the requests received from the first and second modems conflict; and if it is determined that the time slots do conflict, wanting access to the common communications channel to the modem of the first and second modems associated with the message having the higher priority to the extent that the time slots conflict.

17. The method of claim 13 wherein using at least one of the traffic rule matrix and the collection of priorities assigned to the messages to control access by the modems to the common communications channel further comprises:

receiving requests from at least first and second modems, wherein each of the requests specify a time slot for which access to the common communications channel is sought; and a particular message for which access to the common communications channel is sought;

determining whether the time slots specified in the requests received from the first and second modems conflict; and if it is determined that the time slots do not conflict, granting access to the common communications channel to both the first and second modems.

18. The method of claim 13 wherein using at least one of the traffic rule matrix and the collection of priorities assigned to the messages to control access to the communications channel further comprises:

receiving requests from at least first, second and third modems, wherein each of the requests specify a time slot for which access to the common communications channel is sought; and a particular message for which access to the common communications channel is sought;

determining whether the time slots specified in the requests received from the first, second and third modems conflict;

if it is determined that the time slots do conflict, further determining that the priority associated with the message specified in the request received from the first modem is highest as among priorities assigned to messages specified in requests received from the first, second and third modems;

granting access to the common communications channel to the first modem during the time slot requested by the first modem;

determining from the messages specified in the requests operational modes to be used by the first, second and third modems when accessing the common communications channel to perform operations involving their respective messages;

consulting the traffic rule matrix to determine whether the operational modes of the second and third modems are compatible with the operational mode of the first modem; and if it is determined that the operational modes specified in the requests received from the second and third modems are not compatible with the operational mode specified in the request received from the first modem, denying access to the common communications channel to the second and third modems to the extent that the time slots specified in the requests received from the second and third modems conflict with the time slot specified in the request received from the first modem.

19. The method of claim 13 wherein using at least one of the traffic rule matrix and the collection of priorities assigned to the messages to control access to the communications channel further comprises:

receiving requests from at least first, second and third modems, wherein each of the requests specify a time slot for which access to the common communications channel is sought; and a particular message for which access to the common communications channel is sought;

determining whether the time slots specified in the request received from the first modem conflict with requests received from the second and third modems;

if it is determined that the time slots do conflict, further determining that the priority associated with the message specified in the request received from the first modem is highest as among priorities assigned to message streams specified in requests received from the first, second and third modems;

granting access to the common communications channel to the first modem during the time slot requested by the first modem;

determining from the messages specified in the requests operational modes to be used by the first, second and third modems when accessing the common communications channel to perform operations involving the messages;

consulting the traffic rule matrix to determine whether the operational modes of the second and third modems are compatible with the operational mode of the first modem;

if it is determined that the operational modes of the second and third modems are compatible with the operational mode of the first modem, further determining whether the time slots specified in the requests received from the second and third modems conflict; and if the time slots sought by the second and third modems do not conflict with one another, granting access to the common communications channel to each of the first, second and third modems during the time slots respectively sought by each of the first, second and third modems.

20. The method of claim 13 wherein using at least one of the traffic rule matrix and the collection of priorities assigned to the messages to control access to the communications channel further comprises:

receiving requests from at least first, second and third modems, wherein each of the requests specify a time slot for which access to the common communications channel is sought; and a particular message for which access to the common communications channel is sought;

determining whether the time slots specified in the request received from the first modem conflict with requests received from the second and third modems;

if it is determined that the time slots do conflict, further determining that the priority associated with the message specified in the request received from the first modem is highest as among priorities assigned to messages specified in requests received from the first, second and third modems;

granting access to the common communications channel to the first modem during the time slot requested by the first modem;

determining from the messages specified in the requests operational modes to be used by the first, second and third modems when accessing the common communications channel to perform operations involving the messages;

consulting the traffic rule matrix to determine whether the operational modes of the second and third modems are compatible with the operational mode of the first modem;

if it is determined that the operational modes of the second and third modems are compatible with the operational mode of the first modem, determining whether the time slots specified in the requests received from the second and third modems conflict with one another;

if it is determined that the time slots specified in the requests received from the second and third modems conflict, further determining whether the operational modes of the second and third modems are compatible; and if the operational modes of the second and third modems are not compatible, granting access to the common communications channel during the conflicting portion of the time slots sought by second and third modems to the modem of the second and third modems associated with the message having the highest priority.

21. The method of claim 13 wherein creating a traffic rule matrix to control access by the modems to the common communications channel further comprises evaluating the modems to identify compatible operational modes of the modems.

22. The method of claim 13 wherein the traffic rule matrix prevents a first modem seeking to perform a communication operation involving a relatively low priority message from accessing common hardware communication resources concurrently with a second modem performing a communication operation involving a relatively high priority message.

23. The method of claim 13 wherein the traffic rule matrix prevents a first modem seeking to transmit a relatively low priority message in the common communications channel when transmission of the relatively low priority message would interfere with concurrent reception of a relatively high priority message by a second modem.

24. The method of claim 13 wherein the traffic rule matrix allows a first modem seeking to transmit a relatively low priority message in the common communications channel to transmit the relatively low priority message when it is determined that interference generated by the first modem during transmission operations would not degrade concurrent operations of a second modem already using the common communications channel to perform operations involving a relatively high priority message.

25. An apparatus comprising:

a plurality of modems, each modem of the plurality of modems associated with at least one message and configured to transmit and to receive signals in a common communication channel; and a modem access control unit coupled to each of the plurality of modems, the modem access control unit configured to assign each of the messages associated with the modems a priority and at least one connection property; and to use the priorities, the connection properties assigned to the messages, and a traffic rule matrix to control access by the modems to the common communications channel, the traffic rule matrix identifying compatible operational modes of at least first, second and third modems in the multi-modem terminal, the traffic rule matrix comprising entries for each of the first, second and third modems for the operational modes of transmission and reception, the entries indicating whether a selected modem and its corresponding operational mode is compatible with another selected modem and its corresponding operational mode.

26. The apparatus of claim 25 where at least some of the modems of the plurality of modems are synchronized to different external clock references, and wherein the apparatus is further configured to synchronize operations of the modems to a common clock reference when controlling access by the modems to the common communications channel.

27. The apparatus of claim 25 wherein the modem access control unit is further configured to use a pattern masking procedure to control access by the modems to the common communications channel.

28. The apparatus of claim 27 wherein the pattern masking procedure prevents a modem seeking to perform an operation involving a relatively low priority message from using the communications channel at the same time as a modem performing an operation involving a relatively high priority message.

29. The apparatus of claim 25 wherein the modem access control unit is further configured to use a traffic rule matrix to control access to the common communications channel by the modems.

30. The apparatus of claim 29 wherein the traffic rule matrix is configured to permit concurrent use of the common communications channel by at least some of the modems.

31. The apparatus of claim 29 wherein the modem access control unit is further configured to evaluate operational modes of each of the modems, and to determine from the operational modes which modems are capable of using the communications channel concurrently with acceptable results; and to generate the traffic rule matrix so that the traffic rule matrix reflects compatibility of at least some of the modems.

32. A computer program product comprising a non-transitory computer readable memory medium tangibly embodying a computer readable program, the computer readable program executable by data processing apparatus, the computer readable program, when executed, configured to assign each message of a plurality of messages a priority and at least one connection property, wherein at least one message of the plurality of messages is associated with at least one modem of a plurality of modems in a multi-modem terminal; and to use the priorities, the connection properties assigned to each of the messages, and a traffic rule matrix to control access by the modems to a common communications channel, the traffic rule matrix identifying compatible operational modes of at least first, second and third modems in the multi-modem terminal, the traffic rule matrix comprising entries for each of the first, second and third modems for the operational modes of transmission and reception, the entries indicating whether a selected modem and its corresponding operational mode is compatible with another selected modem and its corresponding operational mode.

33. The computer program product of claim 32 wherein the computer readable program, when executed, is further configured to use a pattern masking procedure when controlling access by the modems to the communications channel.

34. The computer program product of claim 33 wherein the pattern masking procedure prevents a modem seeking to perform a communication operation involving a relatively low priority message from using the communications channel at the same time as a modem performing a communication operation involving a relatively high priority message.

35. The computer program product of claim 32 wherein the computer readable program, when executed, is further configured to use a traffic rule matrix to control access by the modems to the common communications channel.

36. The computer program product of claim 35 wherein the traffic rule matrix is configured to permit concurrent use of the common communications channel by at least some of the modems.

37. The computer program product of claim 35 wherein the computer readable program, when executed, is further configured to evaluate operational modes of each of the modems, and to determine from the operational modes which modems are capable of using the communications channel concurrently with acceptable results; and to generate the traffic rule matrix so that the traffic rule matrix reflects compatibility of at least some of the modems.

* * * * *

UNITED STATES PATENT AND TRADEMARK OFFICE
CERTIFICATE OF CORRECTION

| | | |
|---|---|---|
| PATENT NO. | : 7,894,466 B2 | Page 1 of 1 |
| APPLICATION NO. | : 11/647615 | |
| DATED | : February 22, 2011 | |
| INVENTOR(S) | : Pernu | |

It is certified that error appears in the above-identified patent and that said Letters Patent is hereby corrected as shown below:

Claim 1, col. 18, line 51 delete "rude" and insert --rule--.

Signed and Sealed this
Nineteenth Day of April, 2011

David J. Kappos
*Director of the United States Patent and Trademark Office*